(12) United States Patent
Zhang et al.

(10) Patent No.: US 11,797,509 B2
(45) Date of Patent: Oct. 24, 2023

(54) HASH MULTI-TABLE JOIN IMPLEMENTATION METHOD BASED ON GROUPING VECTOR

(71) Applicant: Renmin University of China, Beijing (CN)

(72) Inventors: Yansong Zhang, Beijing (CN); Yu Zhang, Beijing (CN); Shan Wang, Beijing (CN)

(*) Notice: Subject to any disclaimer, the term of this patent is extended or adjusted under 35 U.S.C. 154(b) by 249 days.

(21) Appl. No.: 17/266,080

(22) PCT Filed: Jan. 14, 2020

(86) PCT No.: PCT/CN2020/071885
§ 371 (c)(1),
(2) Date: Feb. 4, 2021

(87) PCT Pub. No.: WO2020/248604
PCT Pub. Date: Dec. 17, 2020

(65) Prior Publication Data
US 2021/0256006 A1   Aug. 19, 2021

(30) Foreign Application Priority Data
Jun. 11, 2019   (CN) .......................... 201910500054.7

(51) Int. Cl.
*G06F 16/22* (2019.01)
*G06F 16/2453* (2019.01)
(Continued)

(52) U.S. Cl.
CPC ........ *G06F 16/2237* (2019.01); *G06F 16/244* (2019.01); *G06F 16/2456* (2019.01); *G06F 16/24544* (2019.01); *G06F 16/283* (2019.01)

(58) Field of Classification Search
CPC ............... G06F 16/2237; G06F 16/244; G06F 16/24544; G06F 16/2456; G06F 16/283;
(Continued)

(56) References Cited

U.S. PATENT DOCUMENTS

| 2010/0131540 | A1 | 5/2010 | Xu et al. |
| 2014/0351239 | A1 | 11/2014 | Davis et al. |
| 2019/0114295 | A1* | 4/2019 | Cao .................. G06F 16/24537 |

FOREIGN PATENT DOCUMENTS

| CN | 103294831 A | 9/2013 |
| CN | 105631003 A | 6/2016 |
| CN | 110263038 A | 9/2019 |

OTHER PUBLICATIONS

CN103294831 (Year: 2013).*
International Patent Application No. PCT/CN2020/071885; Int'l Search Report; dated Apr. 14, 2020; 2 pages.

* cited by examiner

*Primary Examiner* — Mark D Featherstone
*Assistant Examiner* — Kweku William Halm
(74) *Attorney, Agent, or Firm* — BAKER HOSTETLER LLP (57) ABSTRACT

The disclosure includes aspects of a system and/or method including a hash multi-table joining implementation method based on a grouping vector, which includes the following steps: 1) rewriting an SQL query command, and dividing a complete OLAP query command into a subtask of selecting-projecting-grouping-joining operation and an subtask of aggregating operation; 2) creating and generating grouping vector metadata corresponding to a GROUP-BY statement in an SQL command through the subtask of selecting-projecting-grouping-joining operation, and creating a vector index as an output result of the subtask of selecting-projecting-grouping-joining operation; 3) executing aggregation
(Continued)

computation based on the vector index through the subtask of aggregating operation, and storing an aggregation computation result in a corresponding unit of a grouping vector aggregator with the same length as the grouping vector; and 4) merging the aggregation computation result in the grouping vector aggregator with the grouping vector metadata created in the joining operation subtask, and outputting the merged data as a result set of the SQL query command. The disclosure can be widely applied to the field of OLAP data query.

8 Claims, 4 Drawing Sheets

(51) Int. Cl.
*G06F 16/242* (2019.01)
*G06F 16/2455* (2019.01)
*G06F 16/28* (2019.01)

(58) Field of Classification Search
CPC ............ G06F 16/2255; G06F 16/2264; G06F 16/2343
See application file for complete search history.

HASH MULTI-TABLE JOIN IMPLEMENTATION METHOD BASED ON GROUPING VECTOR

CROSS-REFERENCE TO RELATED APPLICATIONS

This application is a U.S. National Stage of International Patent Application No. PCT/CN2020/071885 filed Jan. 14, 2020, which claims priority to China Patent Application No. CN 201910500054.7 filed Jun. 11, 2019, the entire contents of which are incorporated herein by reference.

TECHNICAL FIELD

The present invention relates to a hash multi-table joining implementation method based on a grouping vector, and in particular to a multi-table joining method optimized and designed aiming at data distribution characteristics in OLAP application.

BACKGROUND

Figure 1:
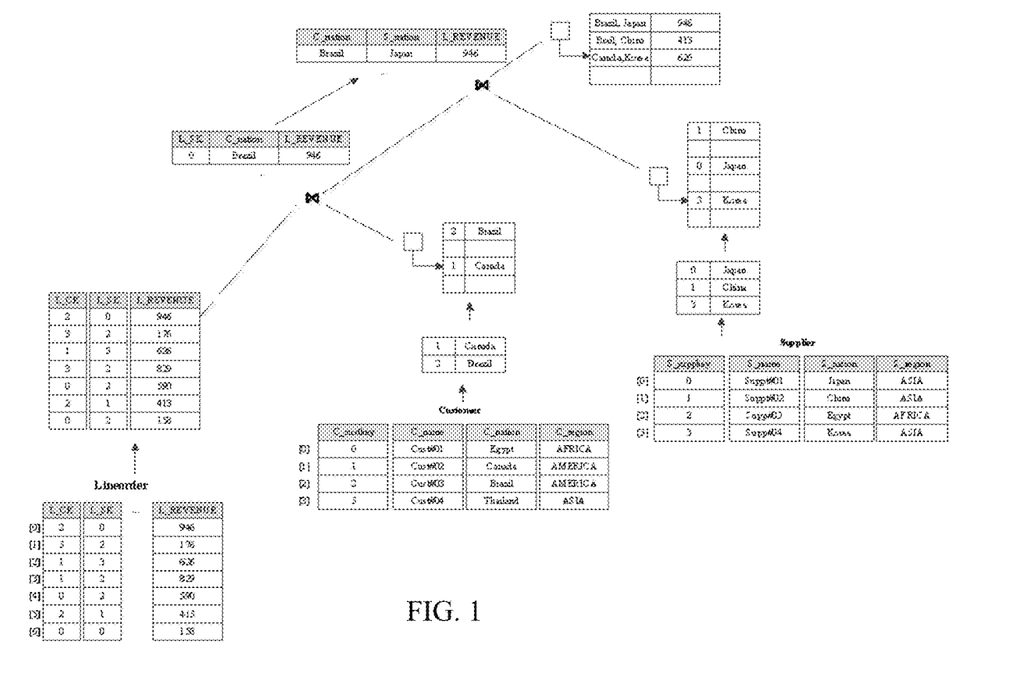
FIG. 1 is an execution process of an SQL query command in a traditional iterative pipeline query processing model.

Analytical SQL queries mainly include selecting, projecting, joining, grouping and aggregating operations. In OLAP application, queries are usually expressed as projecting GROUP-BY attributes on a dimension table according to given selection criteria, and then performing a grouping aggregation computation on designated attributes of measurement columns of a fact table after joining with foreign keys of the fact table. In a traditional relational database query tree, the selecting and projecting operations are pushed down to underlying table nodes, and then joining operations are performed sequentially according to a query tree path, a joining result record is generated iteratively, and hash grouping aggregation computation is performed on the joining result record. For example, the execution process of the following SQL query command is as illustrated in FIG. 1:

select sum(lo_revenue), C_nation, S_nation from lineorder, customer, supplier
    where l_CK=C_custkey
    and l_SK=S_suppkey
    and C_region='AMERICA'
    and S_region='ASIA'
    group by C_nation, S_nation;

The clause "where" in the SQL command selects records which meet the criteria from a "customer" table and a "supplier" table, projects GROUP-BY attributes and corresponding joining attributes, and then creates a corresponding hash table for joining operations. In the SQL command, a fact table projects corresponding attributes, and sequentially performs joining operations with the "customer" table and the "supplier" table to generate joining records with GROUP-BY grouping attributes and aggregation attributes. Finally, aggregation computation is performed through a hash grouping operation.

A traditional iterative pipeline query processing model mainly has the following disadvantages in OLAP query processing:

1. The following operations are sequentially performed: fact table records join with the hash table generated by the "customer" table, the records that meet a first joining criterion are then joined with the hash table generated by the "supplier" table, and only the records that meet all the joining criteria participate in the final hash grouping aggregation computation. At the joining stage, only the attributes of foreign key of the fact table participate in the computation, and grouping and measurement attributes are transmitted between query trees and are discarded when the joining criteria are not met, resulting in invalid data transmission cost. The greater the number of tables to be joined and the lower the selection rate, the greater the invalid data transmission cost.

2. At the hash grouping aggregation computation stage, due to the one-to-many relationship between dimension tables and fact table records, hash grouping on GROUP-BY attributes generates a great repeated hash computation cost. When the GROUP-BY attributes are long character data, the hash computation cost is higher.

3. For heterogeneous storage and computing platforms, dimension tables, columns of foreign key of the fact table and columns of measurement of the fact table may be stored on different platforms due to the great difference of data volume. The pipeline processing model based on the query tree needs to access the data of three different data sets to finish a complete query processing task. The data channel transmission delay between heterogeneous platforms increases the processing delay between the stages of pipeline processing.

SUMMARY

For the above problems, the purpose of the present invention is to provide a hash multi-table joining implementation method based on a grouping vector. Through a late-materialization technology based on a vector index, joining and aggregation computation is divided into two independent computation stages. At the aggregation computation stage, an optimal, GROUP-BY attributes based grouping vector aggregation computing technology is adopted. At the joining stage, a vector index supporting grouping vector aggregation computation is created, and asynchronous pipeline processing between large-granularity based joining and aggregation computation workloads is realized through the vector index.

In order to realize the above purpose, the present invention adopts the following technical solution: a hash multi-table joining implementation method based on a grouping vector includes the following steps:

1) rewriting an SQL query command, and dividing a complete SQL query command into two subtasks: one subtask of selecting-projecting-grouping-joining operation and the other subtask of aggregating operation;

2) in the subtask of selecting-projecting-grouping-joining operation, creating and generating a grouping vector corresponding to the GROUP-BY statement in the SQL query command, and creating a vector index as an output result of the subtask of selecting-projecting-grouping-joining operation;

3) in the subtask of aggregating operation, executing aggregation computation based on the vector index, and storing an aggregation computation result in a corresponding unit of a grouping vector aggregator with the same length as the grouping vector; and 4) merging the aggregation computation result in the grouping vector aggregator with the grouping vector created in step 2) as a result set of the SQL query command for outputting.

Further, in the step 1), in the subtask of selecting-projecting-grouping-joining operation, selecting, projecting and grouping operations act on a dimension table to create a dimension table hash table for the joining operation; the joining operation executes a multi-table joining operation between columns of foreign key of the fact table and the dimension table hash tables, and generates a vector index as an output result of the joining operation; the subtask of aggregating operation executes an aggregation computation task based on the vector index on a column of measurement of the fact table to obtain an aggregation computation result.

Further, in the step 2), the vector index is a vector data structure with the same length as a grouping aggregation computation table, a null unit of the vector index indicates that a record in a table corresponding to the unit does not participate in grouping aggregation computation, a non-null unit indicates that a record in the table corresponding to the unit participates in the grouping aggregation computation; a unit value of the vector index refers to the grouping vector, the grouping vector corresponds to a grouping attribute set generated by the GROUP-BY statement; each grouping attribute member in the grouping attribute set corresponds to one grouping vector unit, a grouping attribute member ID is set as a subscript address of the grouping vector, a corresponding grouping vector unit address is recorded in the non-null unit of the vector index, and the aggregation computation is performed by directly mapping the unit value of the vector index to the corresponding unit of the grouping vector.

Further, in step 2), the joining operation for creating the vector index comprises three implementation methods: a hash early-grouping joining method, a joining method based on multidimensional grouping mapping, and a joining method based on sparse multidimensional array compression.

Further, the hash early-grouping joining method includes the following steps: after executing a hash multi-table joining operation, creating a hash table for a GROUP-BY grouping attribute of a generated joining record, and executing a hash grouping operation; creating one global sequence generator, and assigning a unique grouping vector ID to the vector index by starting from 0 and progressively increasing the value by step length of 1; performing hash detection to the GROUP-BY grouping attribute of each generated joining record, and creating the vector index according to a hash detection result, specifically: if the same GROUP-BY grouping attribute value is not detected in the hash table, creating a hash record, obtaining a current sequence generator value from the global sequence generator as a current grouping attribute value ID, then increasing the sequence generator value by 1, and writing the grouping attribute value into the corresponding unit of the grouping vector corresponding to the current grouping attribute value ID, simultaneously writing the grouping attribute value ID into a unit at a corresponding location in the vector index, or appending a record location ID and the grouping attribute value ID to a compressed vector index; if the same GROUP-BY grouping attribute value is detected in the hash table, storing the grouping attribute value ID of the hash record in the corresponding unit of the vector index, or appending the record location ID and the grouping attribute value ID to the compressed vector index, wherein when the current value of the sequence generator is obtained, a sequence value is locked by using a latch, and the latch is unlocked after the sequence generator value is increased by 1.

Further, the joining method based on multidimensional grouping mapping includes the following steps: after selecting, projecting and grouping operations are performed on the dimension table, performing dynamic dictionary table compression on a projected grouping attribute value, mapping the grouping attribute to one dictionary vector, using a dictionary vector subscript as a grouping attribute ID on the dimension table, and when there are a plurality of grouping attributes on the dimension table, mapping each grouping attribute combination value to one vector unit to obtain a dimension table hash table storing a dimension record primary key value and a grouping ID; executing a multi-table joining operation between columns of foreign key of the fact table and the dimension table hash tables to obtain a plurality of dimension table grouping ID combination values, and mapping a plurality of dimension table grouping IDs to one multidimensional array, wherein each dimension table grouping ID represents a subscript on one dimension of the multidimensional array, and a multi-table joining result corresponds to one multidimensional array address; further mapping the multidimensional array to a one-dimensional vector, converting the multidimensional array address to a subscript of the one-dimensional vector to obtain a vector index, and recording a joining result in the vector index.

Further, the joining method based on sparse multidimensional array compression includes the following steps: after selecting, projecting and grouping operations are performed to the dimension table, performing dynamic dictionary table compression on a projected grouping attribute value, mapping the grouping attribute to one dictionary vector, using a dictionary vector subscript as a grouping attribute ID on the dimension table, and when there are a plurality of grouping attributes on the dimension table, mapping each grouping attribute combination value to one vector unit to obtain a dimension table hash table storing a dimension record primary key value and a grouping ID; executing a multi-table joining operation between columns of foreign key of the fact table and the dimension table hash tables to obtain a plurality of dimension table grouping ID combination values, and mapping a plurality of dimension table grouping IDs to one multidimensional array, wherein each dimension table grouping ID represents a subscript on one dimension of the multidimensional array, and a multi-table joining result corresponds to one multidimensional array address; mapping the multidimensional array generated at a joining stage to a one-dimensional sparse grouping vector, and creating a dense grouping vector according to the one-dimensional sparse grouping vector, that is, assigning a unique sequence to each non-null vector unit by using a sequence generator during mapping; finally creating a vector index based on the dense grouping vector for an aggregation computation operation on a column of measurement data of the fact table.

Further, in step 3), a multi-core parallel aggregation computation method based on a vector index is adopted, and a specific implementation method includes: if the vector index is a fixed-length vector, logically dividing vector index partitions according to a thread number, and logically dividing fact data partitions according to the same location, wherein each thread scans the vector index partitions in parallel and executes vector aggregating operations on the corresponding fact data partitions; if the vector index is in a compressed format, scanning fact table data partitions according to compressed vector index partitions to perform aggregation computation by adopting a method of balanced logical partitions in a compressed vector index, such that the location computation of logical partitions is simplified and the cost of aggregation computation on the logical partitions corresponding to each thread is balanced.

Further, when a parallel vector grouping aggregation operation is executed, the following two aggregation computation methods are adopted: one method is using a private grouping vector by each thread to complete a grouping aggregation computation operation on logical fact data partitions of the thread, and after each thread completes processing, executing a merging computation of grouping vectors between threads to generate a final global grouping vector; the other method is sharing a unified grouping vector by a plurality of threads and executing a global grouping aggregation computation based on a concurrent control mechanism, a global grouping aggregation computation method is adopted when the size of the grouping vector exceeds an optimal threshold, and a private grouping vector aggregation computation method is adopted when the size of the grouping vector does not exceed the optimal threshold, wherein the optimal threshold is 75% of the size of the last-level cache unit of each core of a CPU.

Further, in step 4), a method for merging the aggregation computation result in the grouping vector aggregator with the grouping vector metadata created in the subtask of joining operation includes: when the hash early-grouping joining method is adopted, mapping an address of a grouping vector aggregator unit to the grouping vector at a joining stage to obtain a GROUP-BY attribute value mapped from the address, and merging with the aggregation computation result stored in the grouping vector aggregator into an output result of the SQL query command;

when the joining method based on multidimensional grouping mapping is adopted, mapping an address of a grouping vector aggregator unit to a multidimensional array address, then respectively accessing corresponding dimension table grouping vectors, analyzing corresponding GROUP-BY attribute values, and merging them into an output result of the SQL query command;

when the joining method based sparse multidimensional array compression is adopted, converting non-null units of the grouping vector to multidimensional array subscripts according to vector addresses, mapping each subscript value to each dimension table dictionary table vector, accessing each GROUP-BY attribute value, simultaneously accessing the aggregation computation result in the grouping vector aggregator unit according to a grouping vector aggregator address value stored in grouping vector units, and generating an output result of the SQL query command.

By adopting the above technical solution, the present invention has the following advantages: 1. In OLAP application, the fact table measurement data volume is large, while the size of the joining foreign key columns is determined by the schema, and the data volume is relatively small. By dividing the joining and aggregation computation into two independent computation processes through the vector index in the present invention, the huge fact table measurement data can be stored separately, and the aggregation computation is performed based on the vector index. At the aggregation computation stage, the specific semantics of the query cannot be obtained and semantic analysis cannot be performed on the aggregation computation results, such that the storage of the fact table measurement data (non-semantic numerical data) and the computation (non-semantic numerical computation) have higher security, thus reducing the potential security risk of enterprise data information. 2. The independence of aggregation computation is improved by decoupling the joining operation and the aggregation computation operation in the present invention. When the heterogeneous computing platforms are used, the joining operation and the aggregation computation operation can be optimally distributed on different storage and computing platforms, such that the characteristics of operation and the characteristics of computation can optimally match. Therefore, the present invention can be widely applied to the field of OLAP data query.

DETAILED DESCRIPTION

The present invention will be described below in detail in conjunction with the embodiments with reference to the drawings.

After analyzing the traditional OLAP query processing process, the present invention finds that the query performance can be improved by optimizing from the following aspects:

1. Executing a late-materialization joining strategy, that is, firstly, executing a multi-table joining operation on foreign key attribute columns of the fact table to obtain a final multi-table joining result, and then executing an aggregation computation on fact table measurement attributes. On the one hand, the invalid data transmission of dimension table grouping attributes and fact table measurement attributes in a query tree can be eliminated. On the other hand, the coupling between the fact table measurement attributes and other data in aggregation computation can also be eliminated.

2. Setting a mapping table for a GROUP-BY attribute, storing a final grouping value for querying the GROUP-BY attribute through a grouping vector data structure, using the grouping vector units as aggregators for aggregation computation, replacing a hash table by a grouping vector, and replacing the hash detection by grouping vector address access, so as to reduce the cost of hash grouping computation.

3. At a joining stage, outputting fact table record IDs and grouping vector unit addresses that meet joining conditions to realize a early-grouping operation at the joining stage, so at an aggregation computation stage, access to fact table measurement attributes according to fact table record ID locations can be realized efficiently, and aggregation computation based on the grouping vector can be directly executed.

4. Optimizing the hash grouping computation cost of character GROUP-BY attributes through dynamic dictionary table compression and a multidimensional array address mapping mechanism.

5. The intermediary of joining and aggregation computation is a materialized vector index, which eliminates the strong association between records in the traditional query processing, thus supporting joining and aggregation computation distributed on different computing platforms, and supporting an optimized distribution strategy oriented to data size and computation characteristics.

Early-grouping is completed at a multi-table joining stage by a method of decoupling grouping and aggregating operations in OLAP query processing, groups are stored in a vector structure, early-grouping results in a joining operation are stored in a vector index, non-null units of the vector index are subscript addresses of grouping corresponding to joining records in the grouping vector, the huge fact table can directly execute aggregation computation based on the vector index, aggregation computation results are stored in a grouping vector aggregator, and finally an OLAP query result set is generated through vector analysis. On the one hand, the present invention optimizes the OLAP query processing performance. On the other hand, the multi-table joining operation and aggregation computation are divided into two independent computation processes, such that the joining operation becomes a computation-intensive workload based on smaller-size joining columns, while the aggregation computation becomes a data-intensive workload based on a larger data set, such that two kinds of workloads with different storage and computation characteristics are optimally configured more easily on heterogeneous processors with different storage and computing capacities.

To sum up, the present invention provides a hash multi-table joining implementation method based on a grouping vector, which includes the following steps:

1) rewriting an SQL query command, and dividing a complete SQL query command into two subtasks: a subtask of "selecting-projecting-grouping-joining" operation (hereafter referred to as joining operation) subtask and a subtask of aggregating operation;
2) in the subtask of joining operation, creating and generating a grouping vector corresponding to a GROUP-BY statement in the SQL query command, and creating a vector index as an output result of the subtask of joining operation;
3) in the subtask of aggregating operation, executing aggregation computation based on the vector index, and storing an aggregation computation result in a corresponding unit of a grouping vector aggregator with the same length as the grouping vector; and
4) merging the aggregation computation result in the grouping vector aggregator with the grouping vector created in the joining operation subtask as a result set of the SQL query command for outputting.

In step 1), "selecting, projecting and grouping" operations act on a dimension table to create a hash table structure for the "joining" operation stage; the "joining" operation executes a multi-table joining operation between a column of foreign key a fact table and the dimension table hash table, and generates a vector index as an output result of the subtask of joining operation, that is, an aggregation computation is executed, such as select VecInx,sum( . . . ) from FactTable FT group by VecInx, wherein VecInx represents a vector index column created through the subtask of "selecting, projecting, grouping and joining" operation.

Figure 2:
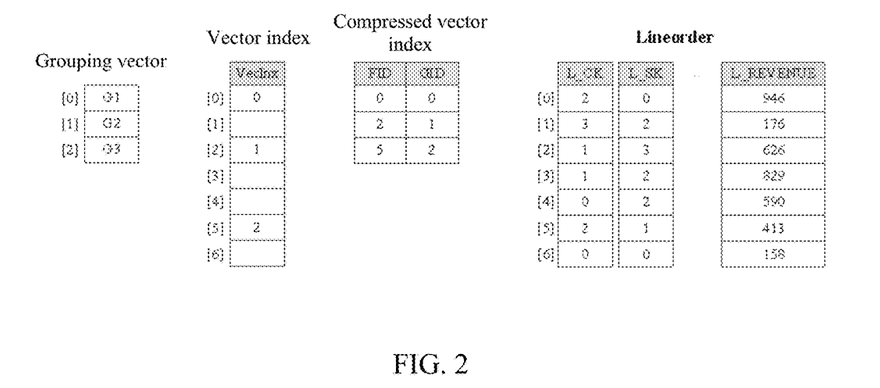
FIG. 2 is a schematic diagram of a data structure of a vector index.

In step 2), the vector index is an index structure for grouping aggregation computation. As shown in FIG. 2, the vector index is a vector data structure with the same length as a grouping aggregation computation table (for example, lineorder), a null unit of the vector index indicates that a record in a table corresponding to the unit does not participate in grouping aggregation computation, and a non-null unit indicates that a record in the table corresponding to the unit participates in the grouping aggregation computation; a unit value of the vector index refers to the grouping vector; the grouping vector corresponds to a grouping attribute set generated by the GROUP-BY statement; each grouping attribute member in the grouping attribute set corresponds to one grouping vector unit; a grouping attribute member ID value is set as a subscript address of the grouping vector; a corresponding grouping vector unit address (i.e., a grouping vector unit ID value) is recorded in the non-null unit of the vector index; and the aggregation computation is performed by directly mapping the unit value of the vector index to the corresponding unit of the grouping vector. Preferably, when there is a larger number of the null units in the vector index, a compressed vector index structure may be adopted, that is, a fixed-length vector index is converted to a variable-length [FID, GID] binary-tuple sequence, wherein FID corresponds to a record location ID of the grouping aggregation computation table, and GID is a grouping vector ID, and the storage and access cost caused by excessive null units in the vector index is eliminated through compression storage.

In step 2), the joining operation for generating the vector index may be implemented by adopting the following three methods:

(1) Hash Early-Grouping Joining Method

In the hash early-grouping joining method, only a foreign key column of the fact table and the dimension table participate in the joining operation.

After a conventional hash multi-table joining operation is executed, creating a hash table for a GROUP-BY grouping attribute of a generated joining record, and executing a hash grouping operation; creating one global sequence generator, and assigning a unique grouping vector ID to the vector index by starting from 0 and progressively increasing the value by step length of 1; performing hash detection to the GROUP-BY grouping attribute of each generated joining record in the grouping vector; if the same GROUP-BY grouping attribute value is not detected in the hash table, creating a hash record, obtaining a current sequence generator ID value from the global sequence generator as a current grouping value ID, then increasing the sequence generator value by 1, and writing the grouping attribute value into the corresponding unit of the grouping vector corresponding to the current grouping attribute value ID, simultaneously writing the grouping attribute value ID into a unit at a corresponding location in the vector index, or a fact record location ID and the grouping attribute value ID are appended to a compressed vector index; if the same GROUP-BY grouping attribute is found during hash detection in the joining record, storing the ID corresponding to the grouping attribute value of the hash record in the corresponding unit of the vector index, or adding a binary-tuple record of a fact record location ID and the grouping attribute value ID to the compressed vector index, wherein when the current value of the sequence generator is obtained, a sequence value is locked by using a latch, and the latch is unlocked after the value is increased by 1, so as to guarantee the uniqueness of the assigned sequence.

After the joining operation is executed, a vector index and a grouping vector that records the corresponding relationship between the GROUP-BY grouping attribute value and the location are obtained.

In this method, the traditional joining operation is divided into a joining grouping stage and an aggregation computation stage. At the multi-table joining stage, a grouping vector is created for a GROUP-BY attribute, and a vector index is created for aggregation computation, such that subsequent aggregation computation can be executed independently. At the same time, the aggregation computation based on the grouping vector ID blocks the grouping attribute semantics of queries, which eliminates the query semantics for the aggregation computation executed on the fact table and is beneficial to the protection of user query semantics.

Figure 3:
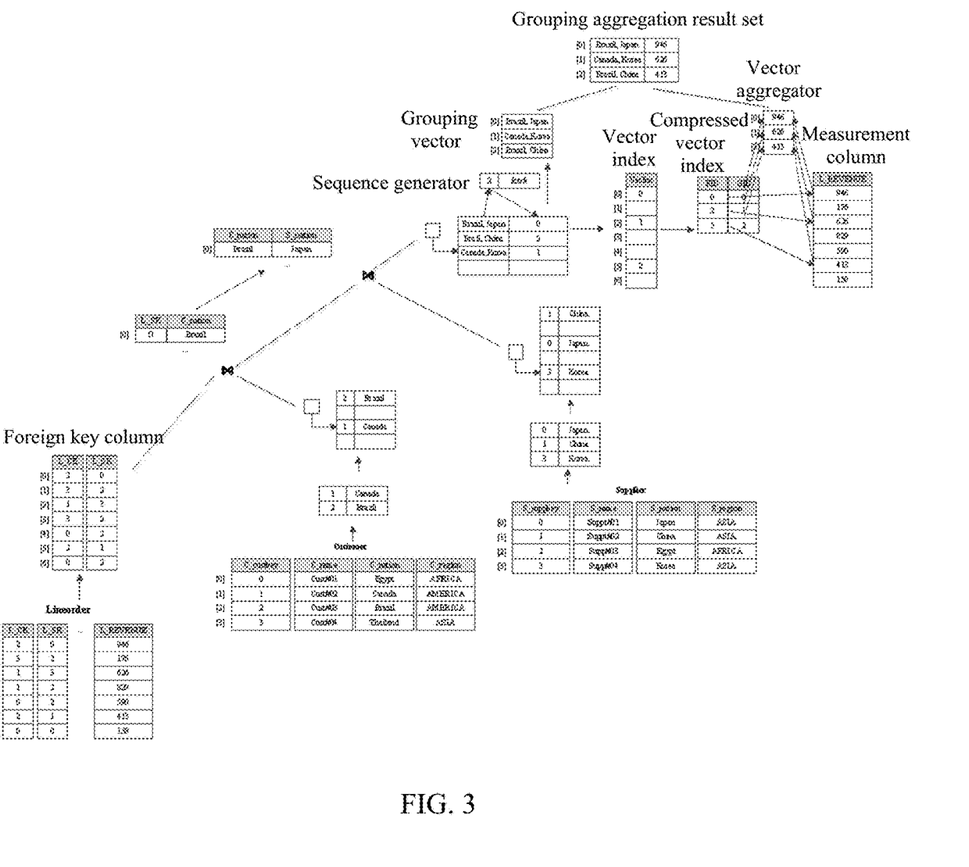
FIG. 3 is an execution case of a hash early-grouping joining method according the present invention.

As shown in FIG. 3, an execution case of the hash early-grouping joining method is illustrated. An SQL query command below is taken as an example:

select sum(lo_revenue), C_nation, S_nation from lineorder, customer, supplier
where l_CK=C_custkey
and l_SK=S_suppkey
and C_region='AMERICA'
and S_region='ASIA'
group by C_nation, S_nation;

According to the SQL query command, a "lineorder" table projects L_CK, L_SK columns to execute query processing, and the record contains the location ID of the record, such as a column subscript in column storage; a "customer" table performs filter operation based on the condition C_region='AMERICA', then projects a primary key column c_custkey and a grouping attribute column c_nation, and creates a joining hash table based on the primary key column c_custkey; a "supplier" table performs filter operation based on the condition S_region='ASIA', then projects a primary key column s_suppkey and a grouping attribute column s_nation, and creates a joining hash table based on the primary key column s_suppkey.

After the "lineorder" table record executes the hash joining operation on a "customer" table and "supplier" table with hash tables, a joining result with a lineorder record ID is generated, a grouping vector is created for a GROUP-BY attribute value in the joining result, and the GROUP-BY attribute value is mapped to one array grouping vector. A global sequence generator is created, which is a sequence increasing with step length of 1, as the grouping ID of the query. The initial value is 0, the data structure is locked during reading through a latch, the current value is assigned to the applied hash record, then the sequence value is increased by 1, and thereafter the latch is unlocked to ensure that each sequence value is assigned uniquely. In the final stage of multi-table joining, a hash table is created for the GROUP-BY attribute. When each GROUP-BY attribute value is created in the hash table for the first time, the current sequence value is obtained from the global sequence generator and is written into the hash record. For example, when a record (Brazil, Japan) is accessed for the first time, a sequence generator value 0 is obtained and is written into the hash table. At the same time, the GROUP-BY attribute value (Brazil, Japan) is written into the grouping vector unit [0] corresponding to the current sequence value. At the same time, the grouping vector unit address [0] is recorded in the vector index of the same length as the fact table, wherein the vector index subscript corresponds to the fact record ID, and the vector index unit records the subscript value [0] of the GROUP-BY attribute in the grouping vector. When the joining selection rate is low enough, the vector index adopts a compressed format to record the fact record ID and the grouping ID [0, 0] of the non-null vector index unit through the binary-tuple [FID, GID].

(2) Joining Method Based on Multidimensional Grouping Mapping

Further, the present invention pushes early-grouping down to the dimension table access stage from the joining end, and creates a grouping vector based on a multidimensional array.

In order to further optimize the cost of repeated hash computation of character GROUP-BY attributes at each joining stage, a compression coding technology is adopted for the GROUP-BY attributes of the dimension table.

At the dimension table processing stage (i.e., the stage of creating a hash table based on the "selecting, projecting and grouping" operations), performing dynamic dictionary table compression on the grouping attribute value projected after filter operation, mapping the grouping attribute to one dictionary vector, using a dictionary vector subscript as the grouping attribute ID on the dimension table, and when there are a plurality of grouping attributes on the dimension table, mapping each grouping attribute combination value to one vector unit. What are stored in the dimension table hash table include the primary key value and the grouping attribute ID of the dimension record. The joining result is a combination value of a plurality of dimension table grouping attribute IDs. The combination value of the plurality of dimension table grouping attribute IDs is mapped to one multidimensional array, wherein each dimension table grouping attribute ID represents a subscript on one dimension of the multidimensional array, and the multi-table joining result corresponds to one multidimensional array address. The multidimensional array is further mapped to a one-dimensional vector, and the multidimensional array address is converted to a one-dimensional vector subscript to obtain a vector index, and the joining result is recorded in the vector index.

A multidimensional array mapping mechanism is suitable for the situation where the dimension table grouping attributes are smaller, the corresponding multidimensional arrays is smaller or the utilization rate of multidimensional array units is higher. When the mapped multidimensional arrays is larger (when the size of multidimensional arrays is larger than the size of thread private caches in a CPU) and there is less multidimensional array units actually used in a query (the number of units actually used in the multidimensional array is less than a certain threshold, such as 1%), the utilization rate of the grouping vector mapped from the multidimensional array is lower and the aggregation computation performance is reduced.

Figure 4:
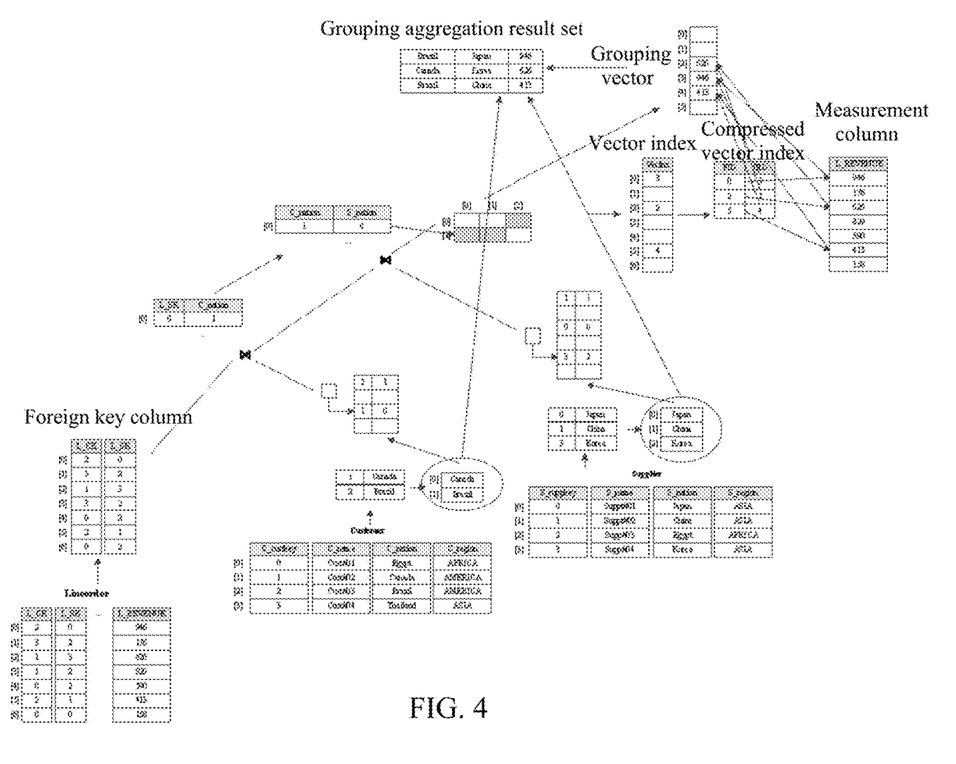
FIG. 4 is an example of a joining method based on multidimensional grouping mapping according the present invention.

As shown in FIG. 4, an example of the joining method based on multidimensional grouping mapping is illustrated. A primary key column c_custkey and a grouping column c_nation in the record are filtered out from a "customer" table. Dictionary table compression is performed on the grouping attribute column c_nation in the result set, wherein different grouping values are stored in a dictionary vector, and the subscript of the dictionary vector is used as a compression code of the grouping value. Similarly, a dictionary vector is also created for grouping attribute s_nation filtered out and projected from a "supplier" table, and the subscript of the dictionary vector is used as a compression code of the s_nation attribute value. The "customer" table and "supplier" table create a hash table based on the grouping attribute compression codes, execute a joining operation with a foreign key column of the lineorder. The joining result is c_nation and s_nation compression encodes and a lineorder record ID, and c_nation and s_nation dictionary vectors are mapped to a two-dimensional array, wherein c_nation and s_nation compression encode values in the joining result correspond to subscripts on two dimensions of the two-dimensional array. The joining result is mapped to the two-dimensional array. The one-dimensional array subscripts converted from the two-dimensional array are stored in the units corresponding to the lineorder record in the vector index. The result of each joining record is stored in the vector index. For the record with the joining result which is null, the corresponding unit in the vector index is set to null. When the selection rate is lower, the vector index adopts a compressed format, that is, the joining result is stored as binary-tuple [FID, GID], and the "lineorder" table ID corresponding to the non-null joining result and the mapped two-dimensional array address are stored in the compressed vector index. Based on the vector index, the aggregation computation is completed on the measurement column, and the measurement column unit at the corresponding location of each non-null vector index unit is mapped to the grouping vector unit corresponding to the two-dimensional array address stored in the vector index unit for aggregation computation. The final grouping vector stores the query result, and the non-null unit vector address is converted to a two-dimensional array subscript format, wherein the array subscript on each dimension is mapped to the unit reading grouping attribute value corresponding to the corresponding dimension table dictionary vector subscript, and a final query result is generated. For example, a grouping vector unit [2] corresponds to a multidimensional array address [0, 2], wherein a first dimension address 0 corresponds to value "Canada" in a "customer" table dictionary vector dictionary vector unit [0], and a second dimension address 2 corresponds to value "Korea" in a "supplier" table dictionary vector unit [2], which are merged with a value 626 stored in the grouping vector unit [2] to obtain a joining result "Canada, Korea, 626", and so on, such that joining results are generated through address conversion and mapping of all non-null units in the grouping vector.

(3) Joining Method Based on Sparse Multidimensional Array Compression

When the multidimensional array is sparse, we further compress the sparse multidimensional array to improve the query processing performance.

At the joining stage (2), a multidimensional array is generated and mapped to a one-dimensional sparse grouping vector. We further create a dense grouping vector for the sparse grouping vector. The specific method is as follow: a sequence generator is used to assign a unique sequence for each non-null mapping vector unit during mapping; after the joining operation is completed, the maximum sequence ID value is the maximum grouping value corresponding to the GROUP-BY attribute, and a grouping vector aggregator corresponding to the length of the maximum grouping value is created. Then, a vector index is created based on the dense grouping vector for the aggregation computation operation on the measurement data column.

The grouping vector aggregator is used for the aggregation computation on the fact table measurement attribute. According to the non-null unit value of the vector index or the value of the GID column value of the compressed vector index, the measurement attribute is mapped to the corresponding unit of the grouping vector aggregator for aggregation computation.

After the aggregation computation task is executed, the non-null units of the grouping vector are converted to multi-dimensional array subscripts according to the vector address, and the subscript values are mapped to the dictionary table vectors of each dimension table, and the GROUP-BY attribute values are accessed. At the same time, the aggregation computation result in the grouping vector aggregator unit is accessed according to the grouping vector aggregator address value stored in the grouping vector unit, and then a grouping aggregation result set is generated.

At the joining stage, the multidimensional array mapping method is adopted to optimize the hash grouping method. At the same time, sparse multidimensional grouping is mapped to a minimum grouping vector aggregator, which optimizes the grouping mapping performance at the aggregation computation stage.

Figure 5:
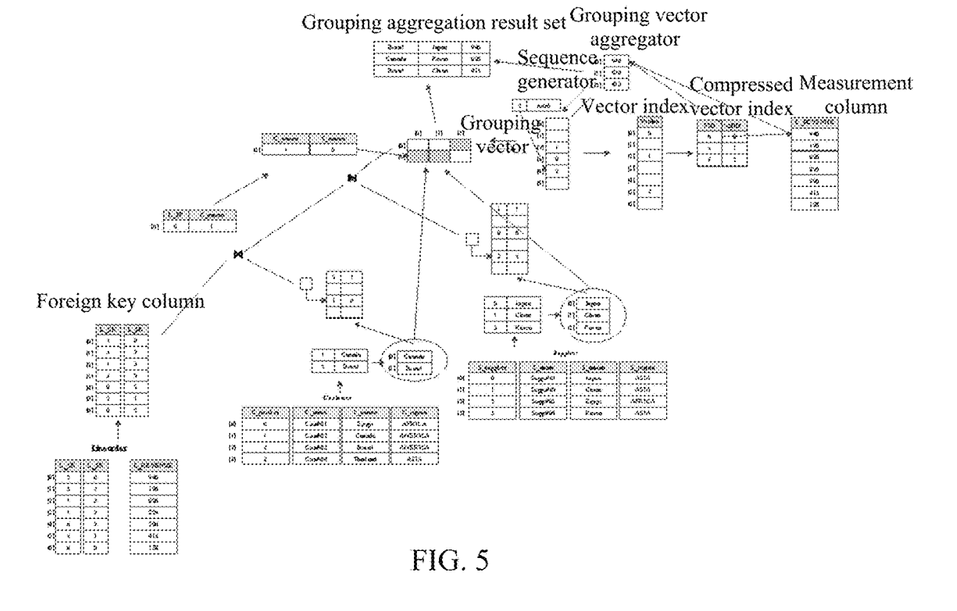
FIG. 5 is an application example of a joining method based on sparse multidimensional array compression according the present invention.

As shown in FIG. 5, an application example of the joining method based on sparse multidimensional array compression is illustrated. Joining creates a two-dimensional array. For example, a joining result record [0] (1, 0) corresponds to a two-dimensional array address [1, 0] and corresponds to a unit address [3] in a one-dimensional grouping vector. A current grouping vector unit [3] is null, and a current value 0 is obtained from a sequence generator and stored in the grouping vector unit [3], and the value 0 in the grouping vector [3] is recorded in a vector index unit [0]. Similarly, when a one-dimensional grouping vector unit corresponding to a two-dimensional address of a joining result is non-null, the value in the grouping vector unit is written into the corresponding vector index unit. That is, when the grouping vector unit corresponding to joining is null, the sequence value is obtained from the sequence generator and stored in the grouping vector unit, and the sequence value is written into the corresponding unit of the vector index. When the joining selection rate is lower, a compressed vector index may be generated directly, and the vector index or compressed vector index is generated after the joining operation is executed.

In the aggregation computation, aggregation computation is completed through the grouping vector aggregator based on the vector index or compressed vector index. For example, a value stored in a vector index unit [2] is 1, and a measurement column [2] unit is accessed, then a measurement value 626 is mapped to a grouping vector aggregator unit [1] for the accumulation computation. After the aggregation computation is completed, each unit of the grouping vector aggregator accesses the grouping attribute value through two-dimensional address mapping, and generates a final query result. A non-null unit address in the grouping vector is mapped to a two-dimensional array address. For example, a grouping vector unit [2] is mapped to [0, 2], wherein a first dimension subscript 0 is mapped to a "customer" table dictionary vector to obtain "Canada", and a second dimension subscript 2 is mapped to a "supplier" table dictionary vector to obtain "Korea", and a grouping vector unit value 1 is mapped to the grouping vector aggregator unit [1] to obtain 626, which are then merged to obtain a query result record "Canada, Korea, 626". In this way, a final query result set is generated after scanning and processing the non-null units of the grouping vector.

In step 3), a multi-core parallel aggregation computation method based on a vector index is adopted.

A basic implementation method of multi-core parallel aggregating operation based on the vector index is as follow: if the vector index is a fixed-length vector, logically dividing vector index partitions according to a thread number, and logically dividing fact data partitions according to the same location, wherein each thread scans the vector index partitions in parallel and executes vector aggregating operations on the corresponding fact data partitions; if the vector index is in a compressed format, adopting the same logical partition method as the fixed-length vector index. On the one hand, the FID value of the compressed vector index needs to be scanned to determine a partition location. On the other hand, when the non-null values in the vector index are distributed in a non-balanced manner, fixed-length logical partition causes the cost of aggregation computation actually executed in different threads to be different, such that it is difficult to balance the workload. The present invention adopts a strategy of balanced logical partitions on the compressed vector index, thus the location computation of the logical partition is simplified and the cost of aggregation computation on the logical partitions corresponding to each thread is more balanced.

When a parallel vector grouping aggregation operation is executed, the following two aggregation computation methods may be adopted: one method is using a private grouping vector by each thread to complete a grouping aggregation computation operation on logical fact data partitions of the thread, and after each thread completes processing, executing a merging computation of grouping vectors between threads to generate a final global grouping vector; the other method is sharing a unified grouping vector by a plurality of threads and executing global grouping aggregation computation based on a concurrent control mechanism.

Figure 6:
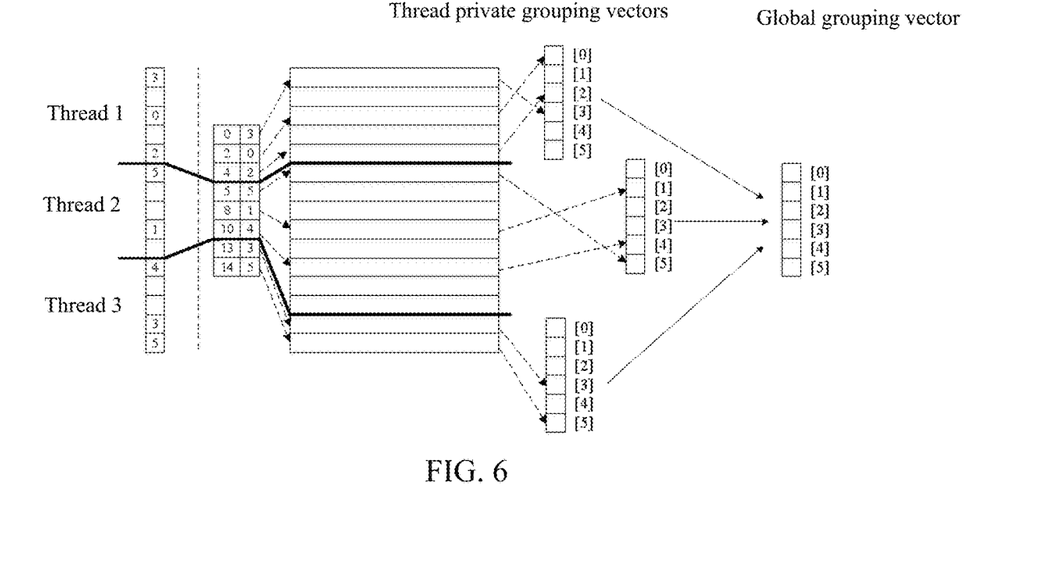
FIG. 6 is a schematic view of a global grouping aggregation computation operation completed by adopting a private grouping vector method according to the present invention.

As shown in FIG. 6, the private grouping vector method maintains a private grouping vector for each thread to complete the aggregation computation on data slices of the thread. Finally, merging computation needs to be performed to the grouping vectors of each thread to obtain a global grouping aggregation computation result. When the size of the grouping vector is smaller than that of the CPU thread private cache (L1 cache, L2 cache, L3 cache slice), grouping aggregation computation has higher data locality, and the private grouping vector improves the parallel computing efficiency.

Figure 7:
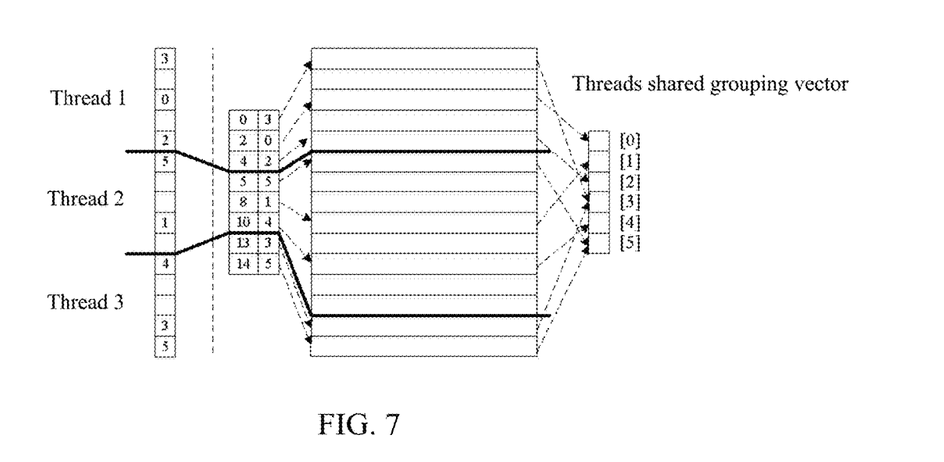
FIG. 7 is a schematic view of a global grouping aggregation computation operation completed by adopting a method that a plurality of threads share a unified grouping vector according to the present invention.

As shown in FIG. 7, the shared grouping vector method maintains one global unified grouping vector for each thread. Each thread concurrently accesses the global grouping vector unit for global aggregation computation. When the accumulated values of the grouping vector units are updated concurrently, a concurrent control mechanism needs be adopted to ensure the correctness of concurrent data update. When the size of the grouping vector exceeds the private cache of the CPU thread, wherein the optimal threshold is that the size of the grouping vector does not exceed 75% of the size of the L3 cache slice, a higher cache miss is caused by the private grouping vector, and in such case, the computing efficiency is higher if the shared grouping vector is adopted.

In step 4), the result sets of the grouping and aggregating operations are respectively stored at the joining stage and the aggregation computation stage. In the joining operation, grouping metadata such as grouping vectors and dimension table grouping dictionary vectors are created, and the specific values of the grouping attributes are recorded. In the aggregation computation, a grouping vector aggregator without semantics is used for computation, and the aggregation computation result is stored in the grouping vector aggregator, wherein the semantics of the aggregate computation cannot be analyzed. In the final stage of query processing, the address of the grouping vector aggregator unit needs to be mapped to the grouping vector at the joining stage to obtain the GROUP-BY attribute value mapped from the address, which is then merged with the aggregation computation result stored in the grouping vector aggregator to obtain a query output result.

Unlike the traditional query processing implementation technology, the present invention uses the vector index as the intermediary between the two computation stages of joining and aggregation, wherein the vector index supports the optimal aggregation computation, and the optimal vector index structure is generated at the joining stage.

The present invention can be applied to heterogeneous computing platforms. The joining stage with high computation cost is deployed on GPU, FPGA, Phi and other high-performance hardware acceleration platforms, and the huge fact table data are stored in a highly-scalable distributed storage system. The vector index is generated after the hardware accelerator platform executes the high-performance joining operation, and the vector index is sent to the data slices of the distributed storage system, to complete the local aggregation computation and aggregation result merging tasks based on the vector index. Finally the global aggregation merging computation is completed, and the aggregation computation result is returned to the master node, and the master node merges the grouping vectors of hardware accelerator platforms and the grouping vector aggregator results returned by the distributed storage system into the query output result set.

The above embodiments are only used to describe the present invention, in which the structure, joining mode, manufacturing process and the like of each component may be changed. Any equivalent transformation and improvement made based on the technical solution of the present invention shall not be excluded from the scope of protection of the present invention.

The invention claimed is:

1. A hash multi-table joining implementation method based on a grouping vector, characterized in, the hash multi-table joining implementation method comprising:
   1) Rewriting an SQL query command, and dividing a complete SQL query command into two subtasks: a subtask of selecting-projecting-grouping-joining operation and a subtask of aggregating operation;
   2) In the subtask of selecting-projecting-grouping-joining operation, creating and generating a grouping vector corresponding to a GROUP-BY statement in the SQL query command, and creating a vector index as an output result of the subtask of selecting-projecting-grouping-joining operation;
   3) in the subtask of aggregating operation, executing aggregation computation based on the vector index, and storing an aggregation computation result in a corresponding unit of a grouping vector aggregator with the same length as the grouping vector; and
   4) Merging the aggregation computation result in the grouping vector aggregator with the grouping vector created in step 2) as a result set of the SQL query command for outputting;
   wherein, in the step 1), in the subtask of selecting-projecting-grouping-joining operation, selecting, projecting and grouping operations act on a dimension table to create a dimension table hash table for the joining operation; the joining operation executes a multi-table joining operation between a column of foreign key a fact table and the dimension table hash table, and generates a vector index as an output result of the joining operation; the subtask of aggregating operation executes an aggregation computation task based on the vector index on a column of measurement of the fact table to obtain an aggregation computation result;
   wherein, in the step 2), the vector index is a vector data structure with the same length as a grouping aggregation computation table, a null unit of the vector index indicates that a record in a table corresponding to the unit does not participate in grouping aggregation computation; a non-null unit indicates that a record in the table corresponding to the unit participates in the grouping aggregation computation; a unit value of the vector index refers to the grouping vector; the grouping vector corresponds to a grouping attribute set generated by the GROUP-BY statement; each grouping attribute member in the grouping attribute set corresponds to one grouping vector unit; a grouping attribute member ID is set as a subscript address of the grouping vector; a corresponding grouping vector unit address is recorded in the non-null unit of the vector index; and the aggregation computation is performed by directly mapping the unit value of the vector index to the corresponding unit of the grouping vector.

2. The hash multi-table joining implementation method based on the grouping vector according to claim 1, wherein, in the step 2), the joining operation for creating the vector index comprises three implementation methods: a hash early-grouping joining method, a joining method based on multidimensional grouping mapping, and a joining method based on sparse multidimensional array compression.

3. The hash multi-table joining implementation method based on the grouping vector according to claim 2, wherein, the hash early-grouping joining method comprises the following steps:

after executing a hash multi-table joining operation, creating a hash table for a GROUP-BY grouping attribute of a generated joining record, and executing a hash grouping operation;

creating one global sequence generator, and assigning a unique grouping vector ID to the vector index by starting from 0 and progressively increasing the value by step length of 1;

performing hash detection to the GROUP-BY grouping attribute of each generated joining record, and creating the vector index according to a hash detection result, specifically;

if the same GROUP-BY grouping attribute value is not detected in the hash table, creating a hash record, obtaining a current sequence generator value from the global sequence generator as a current grouping attribute value ID, then increasing the sequence generator value by 1, and writing the grouping attribute value into the corresponding unit of the grouping vector corresponding to the current grouping attribute value ID, simultaneously writing the grouping attribute value ID into a unit at a corresponding location in the vector index, or appending a record location ID and the grouping attribute value ID to a compressed vector index;

if the same GROUP-BY grouping attribute value is detected in the hash table, storing the grouping attribute value ID of the hash record in the corresponding unit of the vector index, or appending the record location ID and the grouping attribute value ID to the compressed vector index;

wherein, when the current value of the sequence generator is obtained, a sequence value is locked by using a latch, and the latch is unlocked after the sequence generator value is increased by 1.

4. The hash multi-table joining implementation method based on the grouping vector according to claim 2, wherein, the joining method based on multidimensional grouping mapping comprises the following steps:

after selecting, projecting and grouping operations are performed on the dimension table, performing dynamic dictionary table compression on a projected grouping attribute value, mapping the grouping attribute to one dictionary vector, using a dictionary vector subscript as a grouping attribute ID on the dimension table, and when there are a plurality of grouping attributes on the dimension table, mapping each grouping attribute combination value to one vector unit to obtain a dimension table hash table storing a dimension record primary key value and a grouping ID;

executing a multi-table joining operation between a column of foreign key of the fact table and the dimension table hash table to obtain a plurality of dimension table grouping ID combination values, and mapping a plurality of dimension table grouping IDs to one multidimensional array, wherein each dimension table grouping ID represents a subscript on one dimension of the multidimensional array, and a multi-table joining result corresponds to one multidimensional array address;

further mapping the multidimensional array to a one-dimensional vector, converting the multidimensional array address to a subscript of the one-dimensional vector to obtain a vector index, and recording a joining result in the vector index.

5. The hash multi-table joining implementation method based on the grouping vector according to claim 2, wherein, the joining method based on sparse multidimensional array compression comprises the following steps:

after selecting, projecting and grouping operations are performed to the dimension table, performing dynamic dictionary table compression on a projected grouping attribute value, mapping the grouping attribute to one dictionary vector, using a dictionary vector subscript as a grouping attribute ID on the dimension table, and when there are a plurality of grouping attributes on the dimension table, mapping each grouping attribute combination value to one vector unit to obtain a dimension table hash table storing a dimension record primary key value and a grouping ID;

executing a multi-table joining operation between a column of foreign key of the fact table and the dimension table hash table to obtain a plurality of dimension table grouping ID combination values, and mapping a plurality of dimension table grouping IDs to one multidimensional array, wherein each dimension table grouping ID represents a subscript on one dimension of the multidimensional array, and a multi-table joining result corresponds to one multidimensional array address;

mapping the multidimensional array generated at a joining stage to a one-dimensional sparse grouping vector, and creating a dense grouping vector according to the one-dimensional sparse grouping vector, that is, assigning a unique sequence to each non-null vector unit by using a sequence generator during mapping;

creating a vector index based on the dense grouping vector for an aggregation computation operation on a column of measurement data of the fact table.

6. A hash multi-table joining implementation method based on a grouping vector, characterized in, the hash multi-table joining implementation method comprising:

1) Rewriting an SQL query command, and dividing a complete SQL query command into two subtasks: a subtask of selecting-projecting-grouping-joining operation and a subtask of aggregating operation;

2) In the subtask of selecting-projecting-grouping-joining operation, creating and generating a grouping vector corresponding to a GROUP-BY statement in the SQL query command, and creating a vector index as an output result of the subtask of selecting-projecting-grouping-joining operation;

3) In the subtask of aggregating operation, executing aggregation computation based on the vector index, and storing an aggregation computation result in a corresponding unit of a grouping vector aggregator with the same length as the grouping vector; and 4) Merging the aggregation computation result in the grouping vector aggregator with the grouping vector created in step 2) as a result set of the SQL query command for outputting;

wherein, in the step 3), a multi-core parallel aggregation computation method based on a vector index is adopted, and a specific implementation method comprises;

if the vector index is a fixed-length vector, dividing vector index partitions according to a thread number logic, and dividing fact data partitions according to the same location logic, wherein each thread scans the vector index partitions in parallel and executes vector aggregating operations on the corresponding fact data partitions; and, if the vector index is in a compressed format, scanning fact table data partitions according to compressed vector index partitions to perform aggregation computation by adopting a method of balanced logic partitions in a compressed vector index, such that the location computation of logic partitions is simplified and the cost of aggregation computation on the logic partitions corresponding to each thread is balanced.

7. The hash multi-table joining implementation method based on the grouping vector according to claim 6, wherein, when a parallel vector grouping aggregation operation is executed, the following two aggregation computation methods are adopted: one method is using a private grouping vector by each thread to complete a grouping aggregation computation operation on logic fact data partitions of the thread, and after each thread completes processing, executing a merging computation of grouping vectors between threads to generate a final global grouping vector; the other method is sharing a unified grouping vector by a plurality of threads and executing a global grouping aggregation computation based on a concurrent control mechanism, a global grouping aggregation computation method is adopted when the size of the grouping vector exceeds an optimal threshold, and a private grouping vector aggregation computation method is adopted when the size of the grouping vector does not exceed the optimal threshold, wherein the optimal threshold is 75% of the size of the last-stage cache unit of each core of a CPU thread.

8. The hash multi-table joining implementation method based on the grouping vector according to claim 2, wherein, in step 4), a method for merging the aggregation computation result in the grouping vector aggregator with the grouping vector metadata created in the subtask of joining operation comprises:

when the hash early-grouping joining method is adopted, mapping an address of a grouping vector aggregator unit to the grouping vector at a joining stage to obtain a GROUP-BY attribute value mapped from the address, and merging with the aggregation computation result stored in the grouping vector aggregator into an output result of the SQL query command;

when the joining method based on multidimensional grouping mapping is adopted, mapping an address of a grouping vector aggregator unit to a multidimensional array address, then respectively accessing corresponding dimension table grouping vectors, analyzing corresponding GROUP-BY attribute values, and merging them into an output result of the SQL query command;

when the joining method based sparse multidimensional array compression is adopted, converting non-null units of the grouping vector to multidimensional array subscripts according to vector addresses, mapping each subscript value to each dimension table dictionary table vector, accessing each GROUP-BY attribute value, simultaneously accessing the aggregation computation result in the grouping vector aggregator unit according to a grouping vector aggregator address value stored in grouping vector units, and generating an output result of the SQL query command.

* * * * *